United States Patent [19]

Germond et al.

[11] Patent Number: 4,696,612
[45] Date of Patent: Sep. 29, 1987

[54] TOOL HOLDER ROBOT FOR INTERVENING IN AN ENCLOSURE HAVING AN ACCESS OPENING

[75] Inventors: Jean-Claude Germond; Gilles Clement, both of Paris, France

[73] Assignee: Commissariat a l'Energie Atomique, Paris, France

[21] Appl. No.: 777,714

[22] Filed: Sep. 19, 1985

[30] Foreign Application Priority Data

Sep. 20, 1984 [FR] France ................. 84 14433

[51] Int. Cl.$^4$ ............................. B25J 19/00
[52] U.S. Cl. ................. 414/8; 165/11.2; 414/728
[58] Field of Search ............. 414/8, 718, 728; 165/11.1, 11.2

[56] References Cited

U.S. PATENT DOCUMENTS

| | | | |
|---|---|---|---|
| 2,695,715 | 11/1954 | Goertz et al. | 414/8 X |
| 2,822,094 | 2/1958 | Greer | 414/8 X |
| 3,861,987 | 1/1975 | Harbert | 156/556 |
| 3,913,752 | 10/1975 | Ward et al. | 165/76 X |
| 4,523,884 | 6/1985 | Clement et al. | 414/8 |

FOREIGN PATENT DOCUMENTS

| | | |
|---|---|---|
| 0030484 | 6/1981 | European Pat. Off. . |
| 2211721 | 7/1974 | France . |
| 2375011 | 7/1978 | France . |
| 2394374 | 1/1979 | France . |
| 2398583 | 2/1979 | France . |
| 2500354 | 8/1982 | France . |

Primary Examiner—Leslie J. Paperner
Assistant Examiner—Donald W. Underwood
Attorney, Agent, or Firm—Michael N. Meller

[57] ABSTRACT

A tool holder robot makes it possible to carry out various interventions within a closed enclosure having an access opening. It comprises a cylindrical ferrule fixed to the opening, a cylindrical shaft mounted in rotary manner in the ferrule, a guide rail fixed to the inner wall of the shaft, in which a first arm is slidingly mounted, a second arm pivotably mounted to the free end of the first arm and a tool holder carriage slidingly mounted on the second arm. The second arm is in two parts and can rotate about its longitudinal axis.

Application to the inspection and maintainance, without human intervention, of water boxes of nuclear power station steam generators.

12 Claims, 4 Drawing Figures

TOOL HOLDER ROBOT FOR INTERVENING IN AN ENCLOSURE HAVING AN ACCESS OPENING

BACKGROUND OF THE INVENTION

The present invention relates to a tool holder robot permitting all types of interventions or operations within a closed enclosure having an access opening. It aims more particularly at permitting maintenance and repairs to water boxes of steam generators of pressurized light water nuclear power stations.

The water box of a steam generator is constituted in certain existing cases by a hemispherical enclosure defined by a diametral plane formed by the tubular plate of the exchanger arranged horizontally in the upper part. The water box is vertically subdivided into a hot half-box and a cold half-box by a vertical partition passing through the median plane of the hemisphere. Each water half-box thus forms a closed enclosure shaped like a quarter sphere on which is provided at least one substantially cylindrical access opening oriented in accordance with a radius of the sphere.

Each access opening is called a manhole and has dimensions enabling an operator to enter the enclosure after emptying, when work has to be carried out therein. The manhole is located in the bottom part of the steam generator. The inclination of the opening axis is approximately 45° relative to the vertical. When the steam generator is operating normally, the manhole is closed by a cover studded or pinned to a circular flange defining the manhole. Various types of operation are carried out within water boxes.

It is firstly necessary to regularly decontaminate the inner walls of half-boxes, which are superficially highly contaminated with radiating elements. This decontamination makes it possible to improve the working conditions of personnel having to work both within half-boxes where very high radiation levels prevail and outside the same, particularly in the vicinity of the manhole. The decontamination processes to be put into operation are either of a chemical or a mechanical nature (pressurized water sandblasting).

During each operational shutdown, there is a systematic inspection of the state of the tubes of each generator using various processes, one consisting of checking each tube by introducing an eddy current probe into it. This systematic inspection aims at inspecting any deterioration which may have occurred during operations, such as cracking of tubes, constriction thereof due to corrosion to intermediate spacer plates, blocking of tubes, etc. The leaking or defective tubes then have to be repaired or sealed, which requires the use of numerous difficulty employable tools in view of the environment in question.

It is also useful to be able to inspect and repair the actual tubular plate, which can be damaged by migrating substances transported by the water of the primary circuit.

All the operations to be carried out within enclosures which are highly contaminated with radiating elements lead to significant dangers for the personnel involved, which are exposed to high radioactive radiation.

In order to minimize or eliminate human interventions, a number of solutions have been proposed, which can be grouped into two equipment categories.

First category: remotely controlled devies for intervening on tubes.

A large number of operations to be carried out on tubes were performed manually by an operator who on a number of occasions had to enter the tube for fitting the tools to the tubular plate. A first tool holder device known as a "spider" made it possible to mechanize the movements of the tools on the tubular plate. However, the spider has to be fitted by an operator, who also has to change the tools and detach the spider at the end of the operation. Moreover, the spider only moves very slowly and has a limited operating efficiency, particularly in the case where the tubes are blocked and the spider cannot be fixed to them. Finally, as the location of the spider can only be defined by counting the number of passes made, it is not possible to carry out an absolute marking of the position of the inspected tube.

Another tool holder type for fixing to the plate was proposed in French Patent Application No. 2 211 721. Although this tool holder type has certain advantages compared with the spider, such as absolute marking of the tubes, fast movements and the possibility of fitting several types of tool, it still has important disadvantages, such as its overall dimensions, the obscuring of a row of tubes on which it is possible to intervene and the need for entry of personnel for its fitting and removal.

French Patent Application No. 2 394 374 also discloses a device for fitting a spider-type tool holder in order to reduce the number of times personnel must enter water boxes. This device makes it possible to place the spider on the tubular plate from the outside and then remove it. However, this presupposes the prior fitting in a manual manner of a fixed guidance mast within the box.

Other spider holder devices suffering from the same disadvantages are e.g. disclosed in U.S. Pat. No. 3 913 752.

Second category: remotely controlled devices for intervening on all the elements constituting a water half-box.

These devices have essentially been developed to permit mechanical decontamination and consequentially must not only be able to reach the tubular plate but also the separating partition and the inner wall of the spherical bowl.

A first type of device proposed consists of an arm, whereof one end is articulated by a spherical joint to a plate fixed in the vicinity of a centre of the sphere to the tubular plate. A tool-holder carriage or the like is slidingly mounted on the arm and carries a fixed orientation decontamination nozzle. However, this device still requires the intervention of personnel for its fitting within the water box, as well as the intervention of an operator in front of the manhole for modifying the orientation of the decontamination nozzle during a change of surface to be swept. In this device also hides that portion of the tubular plate corresponding tubes positioned beneath its anchoring plate.

SUMMARY OF THE INVENTION

The present invention aims at providing an intervention device obviating the disadvantages of the device described hereinbefore, whilst permitting all interventions both on the tubular plate and on the separating plate, as well as on the spherical bowl, eliminating any human intervention within the water half-boxes and making it possible to change tools outside the enclosure without removing the device.

The present invention therefore proposes a tool holder robot for carrying out interventions within an enclosure having a cylindrical access opening, wherein it comprises a cylindrical ferrule fixed to said opening, a cylindrical shaft mounted in rotary manner in the ferrule, an axial guide rail parallel to the axis of said shaft and fixed to the inner wall of the latter and in which a first arm is slidingly mounted, a second arm mounted in pivotable manner in the free end of the first arm about an axis perpendicular to the shaft axis, and a tool holder carriage slidingly mounted on the second arm.

The only human intervention required inside the water boxes in the case of such a robot structure are those required for fitting the cylindrical ferrule in place of the manhole cover, followed by the fitting of arms to the rail and also during the changing of tools. The latter operation is made possible from the outside as a result of the positioning of the guide i.e. in an offset position making it possible to provide a free space or tunnel within the shaft to permit the displacement of the assembly constituted by the first arm, the second arm and the tool holder carriage outside the water half-box.

More specifically, the guide rail only occupies part of a cross-section of the cylindrical shaft and leaves free a passage space for the movement of said second arm and its tool, so as to permit a tool change from the outside of the enclosure without disengagement of the tool holder robot.

The combination of the rotation of the cylindrical shaft about its axis and the pivoting of the second arm about its articulation axis forms a spherical articulation or joint.

However, in view of the position generally occupied by the manhole, this spherical joint along does not make it possible to reach all points of the inner wall of the water half-box with a constant tool orientation.

In order to solve this problem, the second arm comprises a first part mounted in pivotable manner on the free end of the first arm and a second part, extending from the first part, mounted so as to rotate about its longitudinal axis with respect to the first part and on which the tool holder carriage is slidingly mounted.

Moreover, the geometrical axis of the first part is angularly displaced by an angle $\alpha$ with respect to the geometrical axis of the cylindrical access opening, in such way that the centre of the spherical joint of the second arm on the first arm can be brought into the vicinity of a perpendicular passing through the geometrical centre of the bowl.

Preferably, the angular displacement $\alpha$ of the first arm is obtained with the aid of a ring placed between the access opening and the fixing ferrule, said ring having bearing faces angularly displaced by the said angle $\alpha$.

The robot according to the invention also offers great security of operation. Thus, it is possible to rapidly intervene on the tool in the base of a breakdown or failure by bending back the arms. Moreover, in the case of a failure in the control of the robot movements, an intervention remains possible by devices which can be manually introduced in the aforementioned tunnel by a poker acting on the rotation axis of the motors.

In order to further improve the techical reliabiity of the assembly, the motor responsible for rotating the shaft with respect to the ferrule is mounted on the latter outside the enclosure, said arrangement guaranteeing the possiblity of rapid intervention on the corresponding movement.

According to a preferred application, the enclosure, within which intervention takes place, is constituted by a steam generator water box, the access opening being constituted by the manhole of said enclosure.

BRIEF DESCRIPTION OF THE DRAWINGS

The invention is described in greater detail hereinafter relative to a non-limintative embodiment and with reference to the attached drawings, which show.

DETAILED DESCRIPTION OF THE INVENTION

Figure 1:
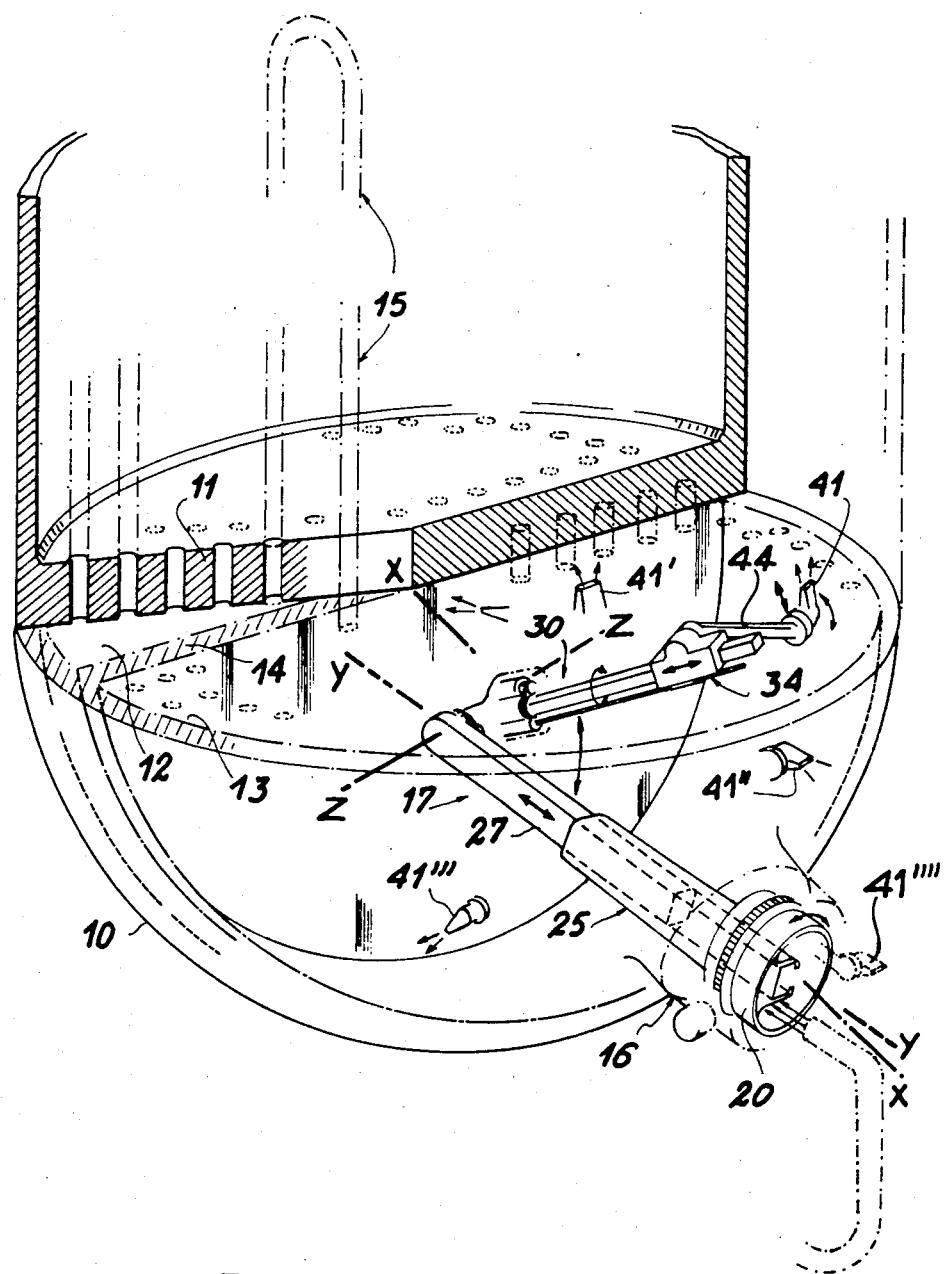
FIG. 1 a perspective view of the lower part of a steam generator of a nuclear power station equipped with a tool holder robot according to the invention and shown in the opened out position.

FIG. 1 shows the lower part of a nuclear power station steam generator constituted by a generally hemispherical water box 10. The hemispherical bowl 10 is defined in its upper part by a substantially horizontally defined planar tubular plate 11. Bowl 10 is subdivided into two water half-boxes 12, 13, separated by a vertical partition 14 passing through a median plane of hemisphere 10. FIG. 1 also shows a hairpin tube 15 connecting water half-box 12 to water half-box 13 and the lower end of which is fixed in the tubular plate 11 on either side of the vertical partition 14.

Each of the water half-boxes 12 and 13 forms a closed enclosure, which can be penetrated by a cylindrical access opening 16, called a manhole. Only manhole 16 or water half-box 13 is shown in FIG. 1. The axis X—X of cylindrical manhole 16 is positioned along a radius of the geometrical sphere of bowl 10. It is generally about 45° from the tubular plate and 45° from the vertical partition 14 ($\frac{1}{8}$ sphere bisectrix). Each half-box also has a primary piping inlet or outlet with a larger diameter than the manhole and positioned symmetrically with respect to a diametral plane perpendicular to partition 4. Water half-box 13 is equipped with a tool holder robot 17 in accordance with the invention.

Figure 4:
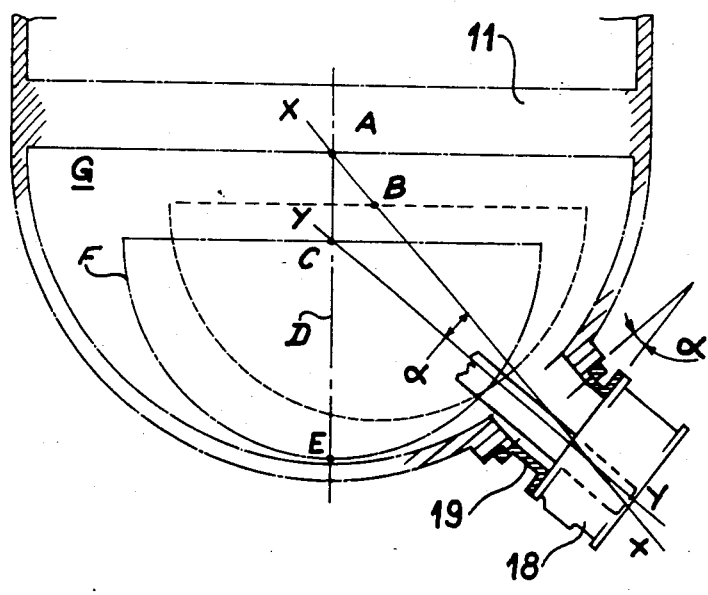
FIG. 4 a diagram serving to explain the interest of an angular displacement of the axis of the cylindrical shaft with respect to the axis of the manhole.

Robot 17 comprises a cylindrical fixing ferrule 18, which is fixed to manhole 16 with the aid of a ring 19 which, as can be seen in FIG. 4, has two non-parallel faces, so that it can bring about an inclination $\alpha$ of the geometrical axis Y—Y of the cylindrical fixing ferrule 18 with respect to the geometrical axis X—X of the manhole, with the objective defined hereinafter.

Robot 17 also comprises a cylindrical shaft 20 coaxial to ferrule 18, mounted in rotary manner within the latter by means of bearings 21, 22. Cylindrical shaft 20 extends from ferrule 18 into the water half-box 13 in accordance with the geometrical axis Y—Y into the shaft and the ferrule and which is also the geometrical rotation axis of shaft 20.

The rotation of shaft 20 about its axis Y—Y is controlled by an electric motor 23 which, by means of a set of pinions, rotates a crown gear 24 connected to the outer wall of cylindrical shaft 20. According to the invention, motor 23 is mounted on ferrule 18 and outside the water half-box 13, so as to permit an easy intervention in the case of a breakdown.

As can be seen from the drawings, robot 17 has an axial guide rail 25, parallel to the geometrical axis Y—Y of shaft 20 and fixed to the inner wall of the latter.

Guide rail 25 has a square open section in which is slidingly mounted the first arm 27 of robot 17. First arm 27 is slidingly mounted in guide rail 25 with the aid of rollers 28 shown in FIG. 2.

The sliding movements of the first arm 27 parallel to its direction in rail 25 are controlled by an electric motor 29 mounted in arm 27 and the output pinion 29' cooperates with a rack 31 formed within rail 25. Motor 29, motor 23 and all the other control motors of robot 17 are direct current geared motors controlled with variable speed.

Robot 17 comprises a second arm 30 mounted in pivotable manner at the free end of first arm 27. Second arm 30 is mounted in pivotable manner on the first arm 27 about a rotation axis Z—Z perpendicular to the geometrical and rotation axis Y—Y of cylindrical shaft 20.

The pivoting movement of second arm 30 about geometrical axis Z—Z is controlled by an electric motor 32 and a set of pinions 33. The electric motor 32, like motor 29, has a square end, which is manually actuated by a poker having a female squre end, which acts on the rotation axis of each of the motors.

The combination of the rotation of shaft 20 about its axis Y—Y and the pivoting of the second arm 30 about its pivoting axis Z—Z defines a spherical articulation or joint which, when the first arm 27 is in the maximum extended position, is positioned as close as possible to the geometrical centre of the hemisphere forming bowl 10. This mechanical arrangement makes it possible to significantly simplify control of the robot and is particularly matched to the geometry of the water box.

The robot 17 also comprises a tool holder carriage 34 slidingly mounted on the second arm 30 parallel to the general longitudinal axis T—T of the latter.

The sliding movement of carriage 34 on the second arm 30 is ensured by means of a motor 35 and e.g. a screw - nut system 36.

In the case of applying robot 17 to operations within a steam generator water box, in which the axis of the cylindrical access opening constituted by the manhole 16 is not perpendicular to tubular plate 11, it is pointed out that it is necessary to reestablish the orientation of the tool holder carriage 34 with respect to the plane of tubular plate 11 in order to bring about a correct sweeping or scavenging of the latter.

To this end, the second arm 30 is constructed in two parts. It comprises a first part 37 mounted in pivotable manner on the free end 31' of the first arm 27 and a second part 38 extending from the first part 37. The second part 38 of second arm 30 is mounted in rotary manner about its general axis T—T with respect to the first part 37 with the aid of bearings 40.

Carriage 34, the orientation of which is to be reestablished, is slidingly mounted on the second part 38 of second arm 30. The rotary movement of second part 38 of second arm 30 relative to the first part 37 is controlled by an electric motor 39, integrated into the first part 37, and a set of pinions 40a.

A description will now be given with reference to FIG. 4 of the advantage resulting from the angular inclination of the geometrical axis Y—Y of shaft 20 relative to axis X—X of manhole 16.

In the upper position, i.e. when the first arm 27 is entirely extended, the centre of the spherical articulation or joint defined hereinbefore does not exactly coincide with the geometrical centre A of the hemisphere 10.

If axes X—X and Y—Y coincided, the centre of the spherical joint would be at point B, i.e. in an axially displaced position (to the right in FIG. 4) relative to the perpendicular d to plate 11 passing through the sphere centre A. The inclination by an angle α of the axis Y—Y relative to axis X—X makes it possible to bring the centre of the spherical joint to a point C located on the line D and in the plane of symmetry of the water half-box. This arrangement facilitates the control of the robot because the displacement can be made symmetrical.

The robot shown in the drawings corresponds to a special application during the decontamination of the walls with the aid of a sandblasting nozzle 41 shown on the tool holder carriage 34 at different working positions 41', 41", 41''' etc. shown in FIG. 1. In position 41'''' (cf. FIGS. 1 and 2), the tool is positioned outside the water box and consequently can be changed without disengaging from the device.

In the decontamination operations, it is important for nozzle 41 to have a constant orientation with respect to the water box wall. To this end, the tool holder carriage 34 is formed from a chassis 43 slidingly mounted on the second arm 30 and on which a segment 44 is mounted in pivotable manner by means of its end about an axis U—U perpendicular to the longitudinal axis T—T of the second arm 30.

Nozzle 41 is mounted in a tool holder device 45 pivotably mounted on the second end 47 of segment 44 about an axis V—V, which is also perpendicular to the axis T—T and parallel to axis U—U. The rotary movement of tool holder 45 and nozzle 41 is not motorized. A parallelogram arrangement ensures the rotation thereof.

The two axes T—T and V—V are obviously motorized axes and are simultaneously or independently controlled.

The translation of the tool holder carriage 34 can neither reach nor pass beyond the aforementioned spherical joint (connection of axes Y—Y and 22), the reversal of segment 44 about the pivoting axis U—U making it possible to reach the tubes of plate 11 located in the vicinity of the geometrical centre of the sphere.

Moreover and as can be seen from FIG. 4, the free end of second arm 30 describes a sphere F which is only tangential with the sphere of the bowl 10 at a single point E. Thus, the length of the second arm 30 is necessarily reduced, so that it cannot reach certain zones G. Segment 44 extending arm 30 then ensures the covering of these zones.

The informatic control systems of the electric actuators of the robot do not differ from conventional systems used for controlling robots and will not be described here.

However, it is pointed out that the kinematic arrangement of the robot greatly facilitates the realization of the automatic control.

The robot is placed on the water half-box very simply by an operator located outside the enclosure. After removing the cover from manhole 16, the operator fits into position with the aid of studs a first removable module constituted by ring 19, ferrule 18, shaft 20 and rail 25. The operator then installs a first arm 27 in the guide rail 25. After fitting the second arm 30 equipped with its tool holder carriage 34 at the free end 31 of first arm 30, in its bent back position shown in FIG. 2, the operator now only has to fix a tool before introducing the mobile assembly into the water half-box. This takes place by controlling the sliding of the first arm 27 in the top position, i.e. towards the left in FIG. 2. When the top position is reached, the robot can be freely opened out within the water half-box by controlling the actuation of the various motors 23, 32, 39 and 35.

Figure 2:
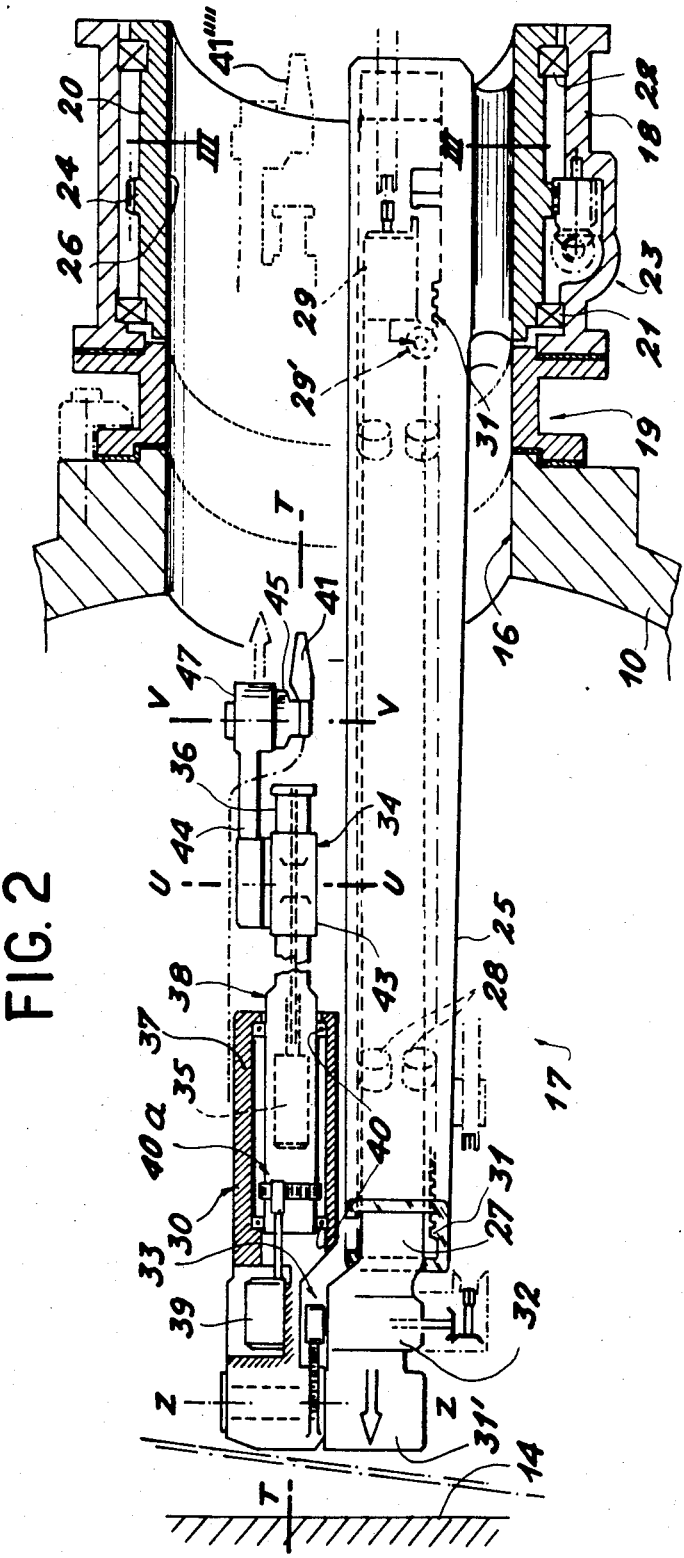
FIG. 2 a sectional view along the median plane passing through the axis of the cylindrical shaft of FIG. 1 and in which the robot arm and tool holder carriage are shown in the bent back position.
Figure 3:
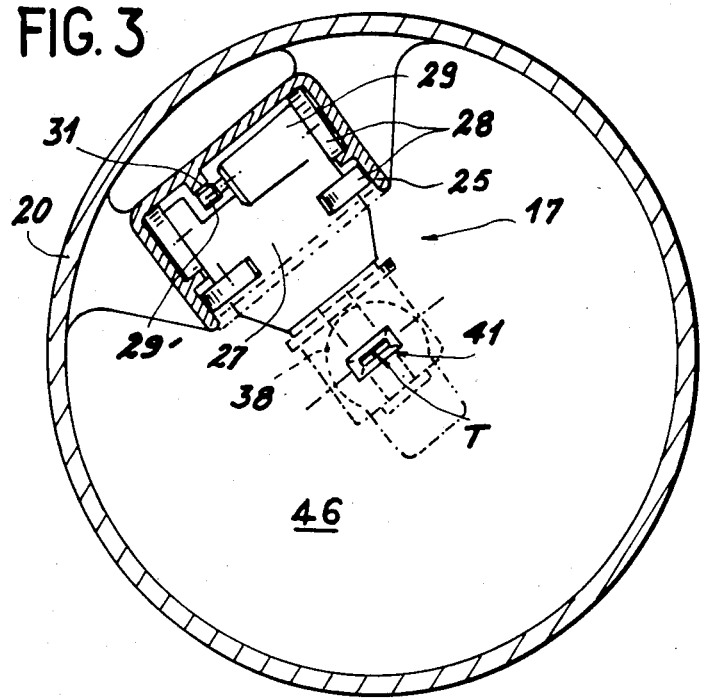
FIG. 3 a section along plane III—III of the cylindrical shaft of FIG. 2 through a plane perpendicular to the axis of the latter.

When the operator wishes to carry out a change of the tool, gripping the tool holder carriage 34, it is merely necessary to bring the first and second arms 27, 30 into their bent back position shown in FIG. 2, whilst ensuring an appropriate positioning of carriage 34 and segment 44. It is then merely sufficient to control the sliding of first arm 27 in guide rail 25 towards the outside of the water box, i.e. to the right in FIG. 2. This sliding is continued until the tool clears the plane of ferrule 18 (in which it is shown in broken line form in FIG. 2) and then emerges outside in a position where it is accessible to the operator.

This tool change without any disassembly of the robot or manual operation within the water half-box is made possible by the offsetting of the guide rail 25 within shaft 20, which makes it possible to leave a free passage 46 constituting an access tunnel for the tool within the water half-box.

Thus, the robot according to the invention has the following advantages:
use of a manhole for fixing the robot,
examination/cleaning of all the internal surfaces of the water box; bowl, partition, tubular plate, and tubes of the latter,
fixing the robot to the flange of the manhole without sealing it so that the bent back robot can be removed from the steam generator without external contamination,
no human intervention within the water box,
change of tools outside the steam generator,
modularity of the robot,
in the case of an incident, manual bending back of the arms,
fast fitting of the robot outside the steam generator on the introduction rail.

What is claimed is:

1. A tool holder robot for carrying out interventions within an enclosure having a cylindrical access opening, comprising a cylindrical ferrule fixed to said opening, said ferrule having two open ends, a cylindrical shaft mounted in rotary manner in the ferrule, an axial guide rail having an opened U-shaped cross-section parallel to central axis Y—Y of the shaft, fixed to the inner wall of the shaft but offset with respect to said central axis Y—Y of said shaft so that said guide rail only occupies part of the cross-section of the cylindrical shaft and leaves free a passage space, a first arm slidingly mounted in said guide rail, said first arm having a first end guided in said guide rail and a free second end which remains outside the guide rail when said first arm is sliding within said guide rail, a second arm mounted in a pivotable manner on said second end of the first arm about an axis Z—Z perpendicular to axis Y—Y of the shaft, and a tool holder carriage slidingly mounted on the second arm, said second arm being able to pivot 360° about axis Z—Z and to be positioned so that its longitudinal axis T—T is parallel to axis Y—Y of the shaft, said first arm being capable of sliding along said guide rail when said longitudinal axis T—T of said second arm is parallel to said axis Y—Y of said cylindrical shaft so that said tool holder carriage carrying a tool is able to go through said free passage space left free by the offsetting of said guide rail with respect to said longitudinal axis Y—Y of said cylindrical shaft, so as to permit a change in the tool carried by said tool holder carriage from the outside of the enclosure without removing the tool holder robot.

2. A tool holder robot according to claim 1, wherein the second arm comprises a first part pivotably mounted on the free end of the first arm and a second part, extending the first part, mounted in rotary manner about its longitudinal axis T—T with respect to the first part and on which the tool holder carriage is slidingly mounted.

3. A tool holder robot according to claim 1, wherein it has a drive motor for rotating the shaft with respect to the ferrule mounted on the latter outside the enclosure.

4. The tool holder robot according to claim 1, wherein the tool holder carriage has a chassis slidingly mounted on the second arm on which a segment is pivotably mounted on one of its ends about an axis U—U perpendicular to the longitudinal axis T—T of the second arm.

5. A tool holder robot according to claim 4, wherein the other end of said segment is provided with a tool holder device pivotably mounted about an axis V—V perpendicular to the longitudinal axis T—T of the second arm.

6. A tool holder robot according to claim 1, wherein a control mechanism makes it possible to manually act from the outside of the enclosure on the translation and rotation motor.

7. A tool holder robot for carrying out intervention within an enclosure having a cylindrical access opening, comprising a cylindrical ferrule fixed to said opening, a cylindrical shaft mounted in rotary manner in the ferrule, an axial guide rail parallel to an axis Y—Y of the shaft and fixed to an inner wall of the shaft, a first arm slidingly mounted in the axial guide, a second arm pivotably mounted on a free end of the first arm and pivotable about an axis Z—Z which is perpendicular to axis Y—Y of the shaft, and a tool holder carriage slidingly mounted on the second arm, wherein the geometrical axis of the first arm and the axis Y—Y of the shaft are angularly displaced by an angle α relative to the geometrical axis X—X of the cylindrical access opening, the angular displacement α of the first arm being obtained by means of a ring inserted between the access opening and the fixing ferrule, said ring having its bearing faces angularly displaced by angle α.

8. A tool holder robot according to claim 1, wherein the enclosure, within which intervention takes place, is constituted by a steam generator water box, the access opening being constituted by the manhole of said enclosure.

9. A tool holder robot according to claim 2, wherein it has a drive motor for rotating the shaft with respect to the ferrule mounted on the latter outside the enclosure.

10. A tool holder robot according to claim 2, wherein the tool holder carriage has a chassis slidingly mounted on the second arm on which a segment is pivotably mounted on one of its ends about an axis U—U perpendicular to the longitudinal axis T—T of the second arm.

11. A tool holder robot according to claim 3, wherein the tool holder carriage has a chassis slidingly mounted on the second arm on which a segment is pivotably mounted on one of its ends about an axis U—U perpendicular to the longitudinal axis T—T of the second arm.

12. A tool holder robot according to claim 7, wherein the enclosure within which intervention takes place comprises a steam generator water box, the access opening comprising the manhole of said water box.

* * * * *